(12) United States Patent  
Lei et al.

(10) Patent No.: US 11,219,828 B2  
(45) Date of Patent: Jan. 11, 2022

(54) VIRTUAL SCENE DISPLAY METHOD, ELECTRONIC APPARATUS, AND STORAGE MEDIUM

(71) Applicant: Tencent Technology (Shenzhen) Company Limited, Shenzhen (CN)

(72) Inventors: Zicong Lei, Shenzhen (CN); Fanwei Liao, Shenzhen (CN); Yang Deng, Shenzhen (CN); Weimin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/904,422

(22) Filed: Jun. 17, 2020

(65) Prior Publication Data

US 2020/0316469 A1     Oct. 8, 2020

Related U.S. Application Data

(63) Continuation of application No. PCT/CN2019/078826, filed on Mar. 20, 2019.

(30) Foreign Application Priority Data

Apr. 27, 2018    (CN) .......................... 201810390707.6

(51) Int. Cl.
    *G06F 3/0484*     (2013.01)
    *A63F 13/537*     (2014.01)
    *G06F 3/0488*     (2013.01)

(52) U.S. Cl.
    CPC ........ *A63F 13/537* (2014.09); *G06F 3/04845* (2013.01); *G06F 3/04886* (2013.01)

(58) Field of Classification Search
    CPC .. F41G 1/473; G06F 3/04886; G06F 3/04845; A63F 13/525; A63F 13/537
    See application file for complete search history.

(56) References Cited

U.S. PATENT DOCUMENTS 10,754,420 B2 *    8/2020    Yu ......................... G06T 15/205
2006/0246968 A1    11/2006    Dyke-Wells
(Continued)

FOREIGN PATENT DOCUMENTS

CN      105498213 A      4/2016
CN      106940899 A      7/2017
(Continued)

OTHER PUBLICATIONS

Tencent Technology, WO, PCT/CN2019/078826, Jun. 13, 2019, 4 pgs.

(Continued)

*Primary Examiner* — Rashawn N Tillery
(74) *Attorney, Agent, or Firm* — Morgan, Lewis & Bockius LLP

(57) ABSTRACT

Embodiments of this application disclose a virtual scene display method performed at an electronic apparatus, and a storage medium, and belong to the field of computer technologies. The method includes: displaying a focusing button in a terminal screen in a case that a virtual scene is in a scaling display mode based on a scope, the focusing button being configured to adjust a scaling ratio of the virtual scene; obtaining an adjusted target field of view (FOV) corresponding to the scope according to a touch operation on the focusing button; obtaining the scaling ratio of the virtual scene according to the target FOV, the target FOV and the scaling ratio being in a negative correlation; and updating the virtual scene in the terminal screen according to the scaling ratio.

20 Claims, 10 Drawing Sheets

(56) References Cited

U.S. PATENT DOCUMENTS

| | | | |
|---|---|---|---|
| 2008/0070684 A1 | 3/2008 | Haigh-Hutchinson | |
| 2016/0381297 A1* | 12/2016 | Alsheuski | H04N 5/23238 348/36 |
| 2017/0284771 A1* | 10/2017 | Roman | F41G 1/38 |
| 2017/0319961 A1* | 11/2017 | Dunn | A63F 13/837 |
| 2019/0226808 A1* | 7/2019 | Gallery | F41G 3/2694 |

FOREIGN PATENT DOCUMENTS

| | | |
|---|---|---|
| CN | 107469353 A | 12/2017 |
| CN | 108579083 A | 9/2018 |

OTHER PUBLICATIONS

Tencent Technology, IPRP, PCT/CN2019/078826, Oct. 27, 2020, 5 pgs.
Tencent Technology, ISR, PCT/CN2019/078826, Jun. 13, 2019, 2 pgs.

\* cited by examiner s
l
FIG. 7
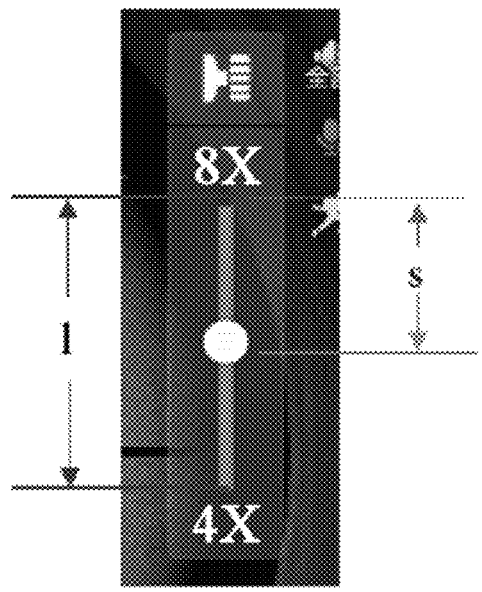
FIG. 8
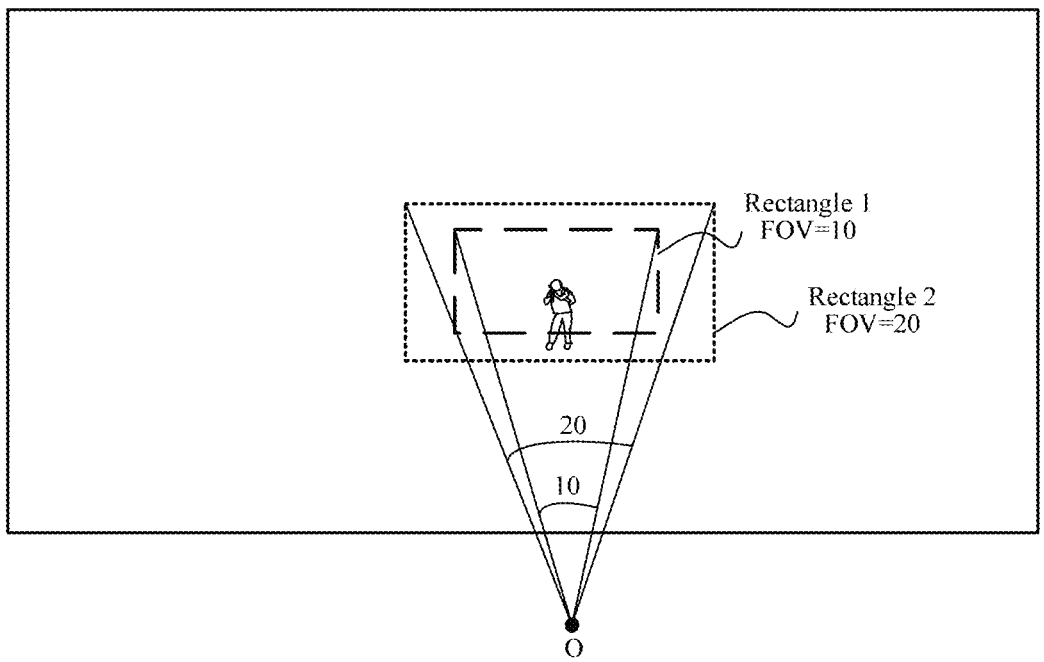
FIG. 9

VIRTUAL SCENE DISPLAY METHOD, ELECTRONIC APPARATUS, AND STORAGE MEDIUM

CROSS REFERENCE TO RELATED APPLICATIONS

This application is a continuation application of PCT Patent Application No. PCT/CN2019/078826, entitled "VIRTUAL SCENE DISPLAY METHOD, ELECTRONIC DEVICE AND STORAGE MEDIUM" filed on Mar. 20, 2019, which claims priority to Chinese Patent Application No. 201810390707.6, entitled "VIRTUAL SCENE DISPLAY METHOD AND APPARATUS, ELECTRONIC APPARATUS, AND STORAGE MEDIUM" filed Apr. 27, 2018, all of which are incorporated by reference in their entirety.

FIELD OF THE TECHNOLOGY

This application relates to the field of computer technologies, and in particular, to a virtual scene display method, an electronic apparatus, and a storage medium.

BACKGROUND OF THE DISCLOSURE

With the development of computer technologies and diversification of terminal functions, there are increasing types of video games that can be run on a terminal. A shooting game such as a first-person shooting (FPS) game or a third-person shooting (TPS) game is a relatively popular game. In this game, a virtual object can use a cold weapon or a hot weapon to fight against another virtual object. Using an example in which the virtual object uses a firearm, the virtual object may further equip the firearm with a scope, and in a case that a scope of which a magnification is not 1 is used for shooting, the terminal can display a scaled virtual scene in a screen.

Currently, in some video games, a scope with a high magnification generally has a corresponding fixed field of view (FOV). In a case that the terminal scales and displays a virtual scene based on the scope, the terminal generally obtains the fixed FOV, and obtains a display region and a scaling ratio of the virtual scene according to the FOV, to display the virtual scene in the terminal screen.

SUMMARY

Embodiments of this application provide a virtual scene display method, an electronic apparatus, and a storage medium, to provide a focusing function, to really simulate a scene that is observed by using a scope with a high magnification in reality. The technical solutions are as follows:

According to an aspect, a virtual scene display method is performed at an electronic apparatus having a processor and memory storing a plurality of programs to be executed by the processor, and the method comprising:

displaying a focusing button in a terminal screen in a case that a virtual scene is in a scaling display mode based on a scope, the focusing button being configured to adjust a scaling ratio of the virtual scene;

obtaining an adjusted target field of view (FOV) corresponding to the scope according to a touch operation on the focusing button;

obtaining the scaling ratio of the virtual scene according to the target FOV, the target FOV and the scaling ratio being in a negative correlation; and updating the virtual scene in the terminal screen according to the scaling ratio.

According to an aspect, a virtual scene display apparatus is provided, including:

a display module, configured to display a focusing button in a terminal screen in a case that a virtual scene is in a scaling display mode based on a scope, the focusing button being configured to adjust a scaling ratio of the virtual scene;

an obtaining module, configured to obtain an adjusted target FOV corresponding to the scope according to a touch operation on the focusing button; and a determining module, configured to obtain the scaling ratio of the virtual scene according to the target FOV, the target FOV and the scaling ratio being in a negative correlation; and the display module being further configured to display the virtual scene in the terminal screen according to the scaling ratio.

According to an aspect, an electronic apparatus is provided, and the electronic apparatus includes: a processor and memory, the memory storing a plurality of programs, and the plurality of programs being loaded and executed by the processor to implement the method operations of the virtual scene display method.

According to an aspect, a non-transitory computer-readable storage medium is provided. The non-transitory computer-readable storage medium stores a plurality of computer programs that, when being executed by a processor of an electronic apparatus, cause the electronic apparatus to implement the method operations of the virtual scene display method.

According to the embodiments of this application, a focusing button is provided in a scaling display mode based on a scope, an FOV corresponding to the scope may be adjusted according to a touch operation of a user on the focusing button, to obtain a target FOV, and a scaling ratio of the virtual scene is obtained according to the obtained target FOV, so that a virtual scene scaled according to the scaling ratio is displayed in a terminal screen. In this way, an operation of focusing the scope in the virtual scene is implemented, to really simulate a situation in which the scope is focused to observe a real scene in reality.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

FIG. 7 is a schematic diagram of an obtaining method for a target field of view according to an embodiment of this application.

FIG. 8 is a schematic diagram of an obtaining method for a target field of view according to an embodiment of this application.

FIG. 9 is a schematic diagram of a display region of a virtual scene according to an embodiment of this application.

DESCRIPTION OF EMBODIMENTS

Figure 1:
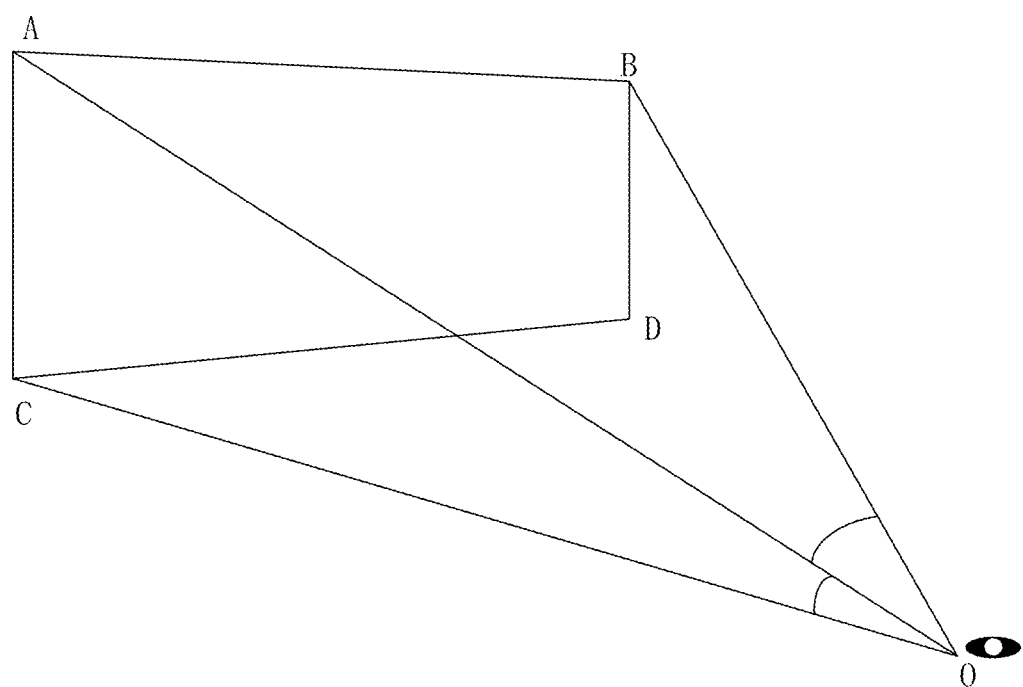
FIG. 1 is a schematic diagram of a field of view according to an embodiment of this application.

To make the objectives, technical solutions, and advantages of this application clearer, the following further describes the implementations of this application in detail with reference to the accompanying drawings.

Embodiments of this application mainly relate to a video game scene or a simulation training scene. Using the video game scene as an example, a user may perform an operation on a terminal in advance. After the terminal detects the operation of the user, a game configuration file of a video game may be downloaded, and the game configuration file may include an application program, interface display data, virtual scene data, or the like of the video game, so that the user may invoke the game configuration file while logging in to the video game on the terminal, to render and display an interface of the video game. The user may perform a touch operation on the terminal. After the terminal detects the touch operation, the terminal may obtain game data corresponding to the touch operation, and render and display the game data, where the game data may include virtual scene data, behavior data of virtual objects in the virtual scene, and the like.

The virtual scene involved in the embodiments of this application may be used for simulating a three-dimensional virtual space, or may be used for simulating a two-dimensional virtual space, and the three-dimensional virtual space or the two-dimensional virtual space may be an open space. The virtual scene may be used for simulating a real environment in reality. For example, the virtual scene may include the sky, the land, and the ocean, and the land may include environment elements such as a desert and cities. The user may control a virtual object to move in the virtual scene, the virtual object may be a virtual image used for representing the user in the virtual scene, or may be a virtual image used for representing a creature associated with the user in the virtual scene, such as a pet of the user, and the virtual image may be in any form, such as a person or an animal. This is not limited in the embodiments of this application. The virtual scene may include a plurality of virtual objects, and each virtual object has a shape and a volume in the virtual scene, and occupies some space in the virtual scene.

Using a shooting game as an example, the user may control the virtual object to freely fall, glide, or open a parachute to fall in the sky of the virtual scene, or run, jump, crawl, or stoop to move forward on the land, or may control the virtual object to swim, float, or dive in the ocean. Certainly, the user may alternatively control the virtual object to take a vehicle to move in the virtual scene. The foregoing scenes are merely used as an example for description, and this is not specifically limited in the embodiments of this application. The user may alternatively control the virtual object to fight against another virtual object by using a weapon, and the weapon may be a cold weapon, or may be a hot weapon. This is not specifically limited in the embodiments of this application.

In the embodiments of this application, a field of view (FOV) is an angle using a lens of a camera as a vertex and between two edge lines of a maximum range of the lens passable to the shot virtual scene, and the greater the FOV, the greater the viewing angle range that can pass through the lens of the camera is. A virtual scene displayed in a terminal screen is the virtual scene that can be shot by the lens of the camera. Alternatively, it may be understood that the lens of the camera is one observation point of the virtual scene.

For example, as shown in FIG. 1, using an example in which a camera is used for shooting the virtual scene, a point O may be used as an observation point, that is, a lens of the camera is located at the point O. In a case that the virtual scene is observed at the observation point (the lens), a viewing angle range that can be observed is a quadrilateral of which vertexes are A, B, C, and D in the figure, where a connecting line between the vertex A and the observation point O may be OA, and a connecting line between the vertex B and the observation point O may be OB. In this case, the OA and the OB are the foregoing two edge lines of the maximum range of the lens passable to the shot virtual scene, and an angle between the OA and the OB is an FOV. Certainly, a connecting line between the vertex C and the observation point O may be OC, the OA and the OC are also two edge lines, and an angle between the OA and the OC is also an FOV. The angle between the OA and the OB may be referred to as a horizontal FOV, and the angle between the OA and the OC may be referred to as a vertical FOV. In a possible implementation, either of the horizontal FOV and the vertical FOV may be selected as the FOV adopted when the virtual scene is shot through the camera, and description is made below only by using an example in which the FOV is the horizontal FOV. This is not limited in the embodiments of this application.

Generally, a shape of a common display screen is a rectangle, so that in the embodiments of this application, description is made only by using an example in which the observed virtual scene is rectangular, and the observed virtual scene may alternatively be circular or in another shape. This is not limited in the embodiments of this application.

In the foregoing shooting game, generally, a firearm may be equipped with a scope, so that the virtual scene may be observed by using the scope. The scope may be provided with a magnification, and the magnification may be 1, or may be a value greater than 1. For example, the scope may be a red dot scope, a holographic scope, a 2× scope, a 4× scope, an 8× scope, or the like, where magnifications of the red dot scope and the holographic scope are both 1, and magnifications of the 2× scope, the 4× scope, and the 8× scope are all greater than 1. Certainly, the magnification of the scope may alternatively be another value. For example, the scope may alternatively be a 15× scope, and the magnification of the scope is not specifically limited in the embodiments of this application.

The magnification of the scope and the foregoing FOV are in a negative correlation. That is, a higher magnification of the scope requires a more concentrated viewing angle, and requires a smaller viewing angle range, that is, requires a smaller FOV. When a scope of which a magnification is not 1 is used for observing the virtual scene, because a range of the virtual scene that can be observed changes as the FOV changes, but a size of the terminal screen is maintained unchanged, the terminal may scale and display the virtual scene.

Generally, when a virtual scene is displayed in the shooting game, two display manners may be included: a first-person viewing angle and a third-person viewing angle. The first-person viewing angle is used for simulating a viewing angle of the virtual object to observe the virtual scene, and in the first-person viewing angle display manner, the camera may be generally located at an eye of the virtual object, or at a surrounding region of the eye of the virtual object, such as the head or the chest of the virtual object. The third-person viewing angle is used for simulating a location around the virtual object to observe the virtual scene, and in the third-person viewing angle display manner, the camera may be generally located at the back of the virtual object, to display the virtual object in the virtual scene, so that the user may see actions of the virtual object and an environment in which the virtual object is located in the virtual scene.

Certainly, generally, a viewing angle direction of the camera is parallel to a viewing angle direction of the virtual object. In a possible implementation, when the user merely intends to adjust the viewing angle direction of the camera without changing a posture of the virtual object, to adjust a currently displayed virtual scene, the terminal may further control, according to a touch operation of the user, the camera to rotate around the virtual object by using a vertical direction of the virtual object in a three-dimensional coordinate system as a central axis. Certainly, in another possible implementation, the terminal may alternatively not change a location of the camera, and merely change the viewing angle direction of the camera. This is not limited in the embodiments of this application.

Figure 2:
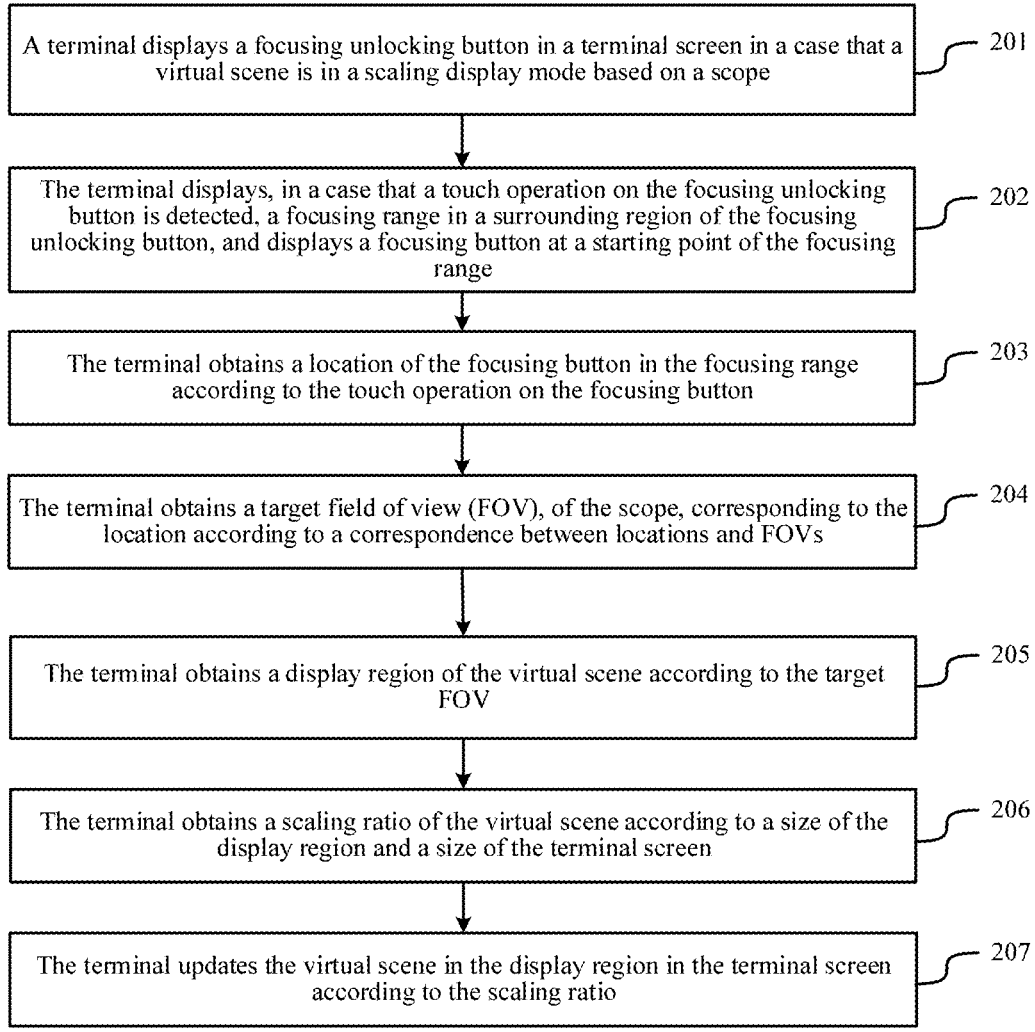
FIG. 2 is a flowchart of a virtual scene display method according to an embodiment of this application.

FIG. 2 is a flowchart of a virtual scene display method according to an embodiment of this application, the method is applied to an electronic apparatus, and the electronic apparatus may be provided as a terminal, or may be provided as a server. This is not limited in the embodiments of this application, and description is made below only by using an example in which the electronic apparatus is provided as a terminal. Referring to FIG. 2, the method may include the following steps:

Step 201: A terminal displays a focusing unlocking button in a terminal screen in a case that a virtual scene is in a scaling display mode based on a scope.

The scope may be a scope with a relatively high magnification, such as an 8× scope, and the scope may alternatively be a scope with another magnification, such as a 4× scope, a 2× scope, or a red dot scope, and the magnification of the scope is not limited in the embodiments of this application. In a possible implementation, in the virtual scene, scopes with different magnifications may be included, and there may be settings in the terminal as follows: one part of the scopes is provided with a focusing function, and the other part of the scopes is not provided with the focusing function. For example, the scopes with high magnifications may be set to be provided with the focusing function, such as the 8× scope, and other scopes with low magnifications such as the 4× scope, the 2× scope, and other scopes are not provided with the focusing function. Correspondingly, in step 201, in a case that the virtual scene is in the scaling display mode based on a scope, the terminal may further determine whether the scope is provided with the focusing function, and when the scope is provided with the focusing function, the terminal displays the focusing unlocking button in the terminal screen. This is not limited in the embodiments of this application.

For example, in some shooting games, a scope with a high magnification (for example, the 8× scope) is a precious scarce resource and has a corresponding powerful combat value, to provide the focusing function for the scope with a high magnification, so that both a viewing angle range and a sighting range based on the scope with a high magnification can be adjusted flexibly, to enable the scope with a high magnification to play an effective role in both a middle-range fight and a long-range fight. In this way, the usage value of the scope with a high magnification is increased, and a function of the scope with a high magnification can effectively match with the rarity, so that the user may feel more intense and excited in a process of contending for scarce resources.

In this embodiment of this application, a focusing function may be provided for the scope, to make the magnification of the scope adjustable. In the terminal screen, a focusing button configured to adjust the magnification of the scope may be provided, so that the user may perform a touch operation on the focusing button to adjust the magnification of the scope, to adjust a scaling ratio of the virtual scene. Correspondingly, the terminal may display the virtual scene based on an adjusted scaling ratio, to simulate a situation in which the scope may be focused in a real environment Specifically, when the terminal detects that the virtual scene is in a scaling display mode based on a scope, the terminal may display a focusing unlocking button in the terminal screen, to provide a focusing function of the scope. The user may perform a touch operation on the focusing unlocking button, to trigger the display of the focusing button, so that the user may operate the focusing button to perform focusing. A display location of the focusing unlocking button may be preset by a related technician, or may be adjusted by the user according to a using habit of the user. This is not limited in the embodiments of this application. In a possible implementation, the display location of the focusing unlocking button may be a location of the scope frame of the scope, so that the virtual scene may not be excessively blocked, thereby improving user experience. In a possible implementation, the terminal may further display prompt information around the focusing unlocking button, and the prompt information is used for reminding the user about a function of the focusing unlocking button.

Figure 3:
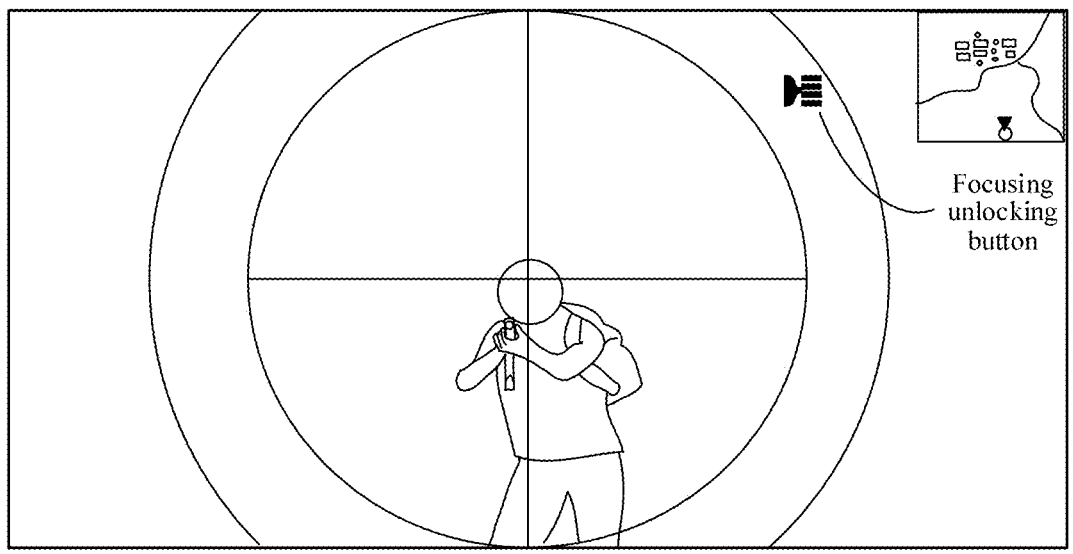
FIG. 3 is a schematic diagram of a terminal interface according to an embodiment of this application.
Figure 4:
FIG. 4 is a diagram of an actual interface of a terminal according to an embodiment of this application.

For example, when the user intends to control the virtual object to observe the virtual scene through the scope, the user may perform an aiming down scope operation on the terminal, where the aiming down scope operation refers to an operation of switching the display mode of the virtual scene to a scaling display mode based on a scope. Specifically, the aiming down scope operation may be a touch operation performed by the user on a target button displayed in the terminal screen, or may be a corresponding operation performed by the user through a mouse, or a press operation on a target key in a keyboard. The target button may be an aiming down scope button, or may be a button of sticking the head out to the left or the right. A specific operating manner of the aiming down scope operation may be preset by a related technician, or may be adjusted by the user according to a using habit of the user. This is not limited in the embodiments of this application. As shown in FIG. 3, using an example in which the virtual object is using a firearm equipped with an 8× scope, and the 8× scope is provided with a focusing function, the terminal detects the foregoing aiming down scope operation, that is, the virtual scene is in a scaling display mode based on a scope, the terminal determines that the scope is provided with the focusing function, and displays a focusing unlocking button in the terminal screen, to provide the focusing function for the user, and an actual interface of the terminal is shown in FIG. 4. The terminal may further display a "distance adjustment" button around the focusing unlocking button, to remind the user about the function of the focusing unlocking button.

Step 202: The terminal displays, in a case that a touch operation on the focusing unlocking button is detected, a focusing range in a surrounding region of the focusing unlocking button, and displays a focusing button at a starting point of the focusing range, the focusing button being configured to adjust a scaling ratio of the virtual scene.

When the user intends to perform focusing to change the scaling ratio of the virtual scene, the user may perform a touch operation on the focusing unlocking button. Specifically, the touch operation may be a tap operation, or may be another operation such as a press operation. This is not limited in the embodiments of this application. When the terminal detects the touch operation, the terminal may display the focusing button, and the user may perform a touch operation on the focusing button to perform focusing.

Specifically, the terminal may display a focusing range in a surrounding region of the focusing unlocking button, and display the focusing button at a starting point of the focusing range, where the focusing range corresponds to an FOV range corresponding to the scope, and the FOV range also corresponds to a range of the scaling ratio of the virtual scene. The scope originally corresponds to a default scaling ratio of the virtual scene, and the user may perform a touch operation on the focusing button to control the focusing button to perform adjustment within the focusing range, to change the FOV corresponding to the scope, and to further change the scaling ratio of the virtual scene. The starting point of the focusing range may correspond to an original FOV corresponding to the scope, that is, an original magnification corresponding to the scope. The touch operation performed on the focusing button may be a drag operation, or may be a tap operation. This is not limited in the embodiments of this application.

The focusing range may be in a bar-shaped adjustment ruler form, or may be in a circular adjustment ruler form. Certainly, the focusing range may be in a numeric adjustment button form or another form, and this is not limited in the embodiments of this application. The focusing range may be preset by a related technician, and the focusing range is not specifically limited in the embodiments of this application.

Figure 5:
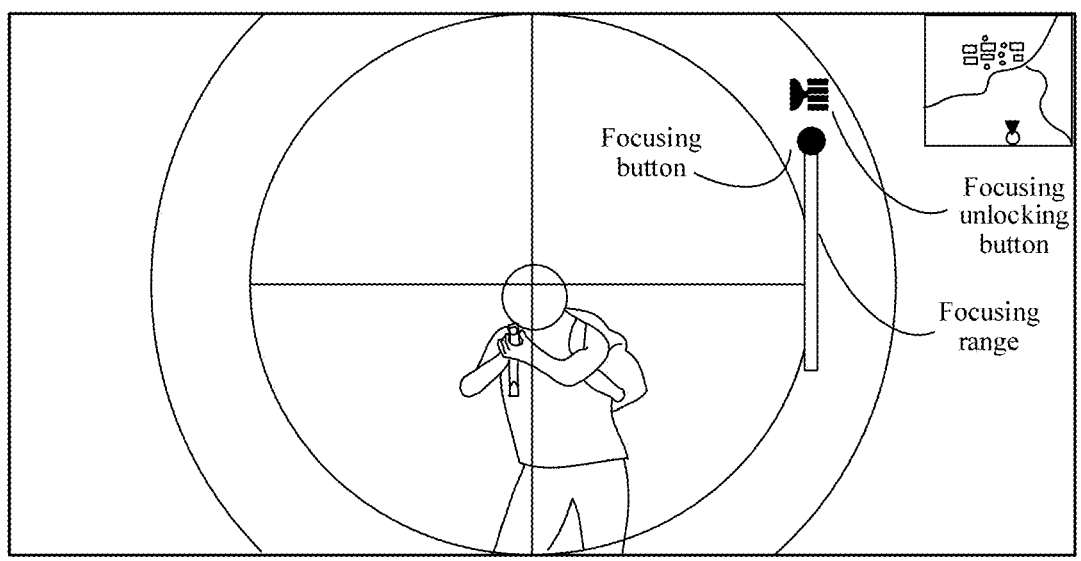
FIG. 5 is a schematic diagram of a terminal interface according to an embodiment of this application.
Figure 6:
FIG. 6 is a diagram of an actual interface of a terminal according to an embodiment of this application.

For example, as shown in FIG. 5, when the terminal detects the tap operation of the user on the focusing unlocking button, the terminal may display a focusing range below the focusing unlocking button, and display the focusing button at a starting point of the focusing range, and an actual interface of the terminal may be shown in FIG. 6. In FIG. 6, merely an example in which a current virtual object is using a firearm equipped with an 8× scope is used, and description is made only by using an example in which a focusing range of the 8× scope is the following range. The focusing range may be: a default scaling ratio of the virtual scene corresponding to the 8× scope to a default scaling ratio of the virtual scene corresponding to a 4× scope. That is, the focusing range of the 8× scope may be set to the default scaling ratio corresponding to the 8× scope to the default scaling ratio corresponding to the 4× scope. The user may perform a drag operation on the focusing button, to drag the focusing button to move within the focusing range. The terminal may further display prompt information around the focusing range, and the prompt information may be a magnification corresponding to a location in the focusing range, to help the user to know the magnification corresponding to the focusing range according to the prompt information, to perform focusing more precisely. The focusing unlocking button, the focusing range, the focusing button, and the prompt information may all be displayed at the location of the scope frame of the scope, so that the virtual scene may not be blocked, thereby improving the user experience.

The foregoing step 201 and step 202 are a process of displaying the focusing button in the terminal screen in a case that the virtual scene is in the scaling display mode based on a scope, and the foregoing provides a manner of displaying, by displaying the focusing unlocking button in the terminal screen, the focusing button when a touch operation on the focusing unlocking button is detected. In a possible implementation, in a case that the virtual scene is in the scaling display mode based on a scope, the terminal may further directly display the focusing button in the terminal screen, so that the user can directly perform a touch operation on the focusing button to change the scaling ratio of the virtual scene, and a manner that is specifically adopted is not limited in the embodiments of this application.

Step 203: The terminal obtains a location of the focusing button in the focusing range according to the touch operation on the focusing button.

A correspondence between the locations in the focusing range and the FOVs may be preset in the terminal. The user may perform a touch operation on the focusing button to change the location of the focusing button in the focusing range, and when the terminal detects the touch operation, the terminal may obtain a location of the focusing button in the focusing range, to perform the following step 204 based on the location.

Specifically, a coordinate range of the focusing range may be prestored in the terminal. In step 203, the terminal may obtain a coordinate location of the focusing button, to know a relative location of the coordinate location in the foregoing coordinate range, and the relative location is the location of the focusing button in the focusing range.

Step 204: The terminal obtains a target FOV corresponding to the location according to a correspondence between locations and FOVs.

Because the user performs a touch operation on the focusing button, and the location of the focusing button is changed, the terminal needs to obtain an adjusted target FOV, to determine how to display the virtual scene based on the target FOV. The target FOV is an FOV corresponding to a scaling ratio of the to-be-displayed virtual scene. Specifically, the terminal may obtain, after obtaining the location of the focusing button in the focusing range, the target FOV according to the foregoing correspondence.

In a possible implementation, the terminal may use a distance between the starting point and an end point of the focusing range as a total distance of the focusing range, and use a difference between an FOV corresponding to the end point and an FOV corresponding to the starting point as a maximum change amount of the FOV. The terminal may obtain, based on the location, a distance between the location of the focusing button and the starting point of the focusing range, and then the terminal may obtain a ratio of the distance to the total distance of the focusing range, to use a product of the ratio and the maximum change amount as a change amount of the FOV, and use a sum of the FOV corresponding to the starting point of the focusing range and the change amount as the target FOV.

For example, still using the example in which the scope is an 8× scope, and a focusing range of the 8× scope is a default scaling ratio corresponding to the 8× scope to a default scaling ratio corresponding to a 4× scope, in this terminal, a default FOV corresponding to the 8× scope may be preset to 10 degrees, and a default FOV corresponding to the 4× scope is preset to 20 degrees. As shown in FIG. 7 and FIG. 8, an obtaining process of the foregoing target FOV may be represented by using a formula as follows:

$$FOV = \frac{s}{1} \times 10 + 10, 0 < s \le 1$$

where FOV is the FOV, that is, the target FOV, s is the distance between the location of the focusing button and the starting point of the focusing range, 1 is the distance between the starting point and the end point of the focusing range, that is, the total distance of the focusing range, and $$\frac{s}{1} \times 10$$

is a change amount of the FOV, where 10 is a difference between the 20 degrees corresponding to the 4× scope and the 10 degrees corresponding to the 8× scope, that is, the maximum change amount, and 1 is a real number greater than 0.

For example, if the user drags the focusing button to a central point of the focusing range, the foregoing $$\frac{s}{1}$$

may be 0.5, and an FOV obtained by the terminal may be 15.

The foregoing step 203 and step 204 are a process of obtaining an adjusted target FOV corresponding to the scope according to the touch operation on the focusing button, and the foregoing merely uses an example in which the adjusted target FOV is obtained based on the location of the focusing button in the focusing range. In a possible implementation, the terminal may alternatively provide a focusing range that is in a numeric form, and the user adjusts the numeric. Correspondingly, a transformation relationship between the numeric and the target FOV may be preset in the terminal. Certainly, the focusing range may alternatively be in another form, and an implementation that is specifically adopted is not limited in the embodiments of this application.

In a possible implementation, to reduce the block to the virtual scene, after step 204, in a case that a touch operation on the focusing unlocking button is detected again, the terminal may further hide the focusing button and the focusing range.

Step 205: The terminal obtains a display region of the virtual scene according to the target FOV, a size of the display region and the target FOV being in a positive correlation.

The greater the FOV is, the greater the viewing angle range of the lens of the camera is, that is, the greater the range of the virtual scene that can be shot by the lens is. A real size of the virtual scene does not change, and a size of the terminal screen does not change either, so that the greater the range of the virtual scene that can be shot by the lens is, the less the scaling ratio of the virtual scene is in a case that the shot virtual scene is displayed in the terminal screen. The terminal may obtain, after obtaining the target FOV in step 204, the display region of the virtual scene according to the target FOV, and the greater the target FOV is, the greater the size of the display region is.

For example, as shown in FIG. 9, the lens of the camera is at a location O. In a case that the FOV is 10 degrees, a range of the virtual scene that can be shot by the lens is a range within a rectangle 1. That is, the display region of the virtual scene is a region within the rectangle 1. In a case that the FOV is 20 degrees, a range of the virtual scene that can be shot by the lens is a range within a rectangle 2. That is, the display region of the virtual scene is a region within the rectangle 2. As can be seen, a size of the region within the rectangle 2 is greater than a size of the region within the rectangle 1.

Step 206: The terminal obtains the scaling ratio of the virtual scene according to the size of the display region and a size of the terminal screen, the scaling ratio of the virtual scene being used for scaling the virtual scene in the display region to the size of the terminal screen.

After obtaining the display region of the virtual scene, the terminal may further obtain the scaling ratio of the virtual scene used for displaying the virtual scene in the display region in the terminal screen. The scaling ratio may be a ratio of the size of the terminal screen to the size of the display region. Specifically, the terminal may obtain a ratio of a width of the terminal screen to a width of the display region, or may obtain a ratio of a height of the terminal screen to a height of the display region. This is not limited in the embodiments of this application.

Figure 10:
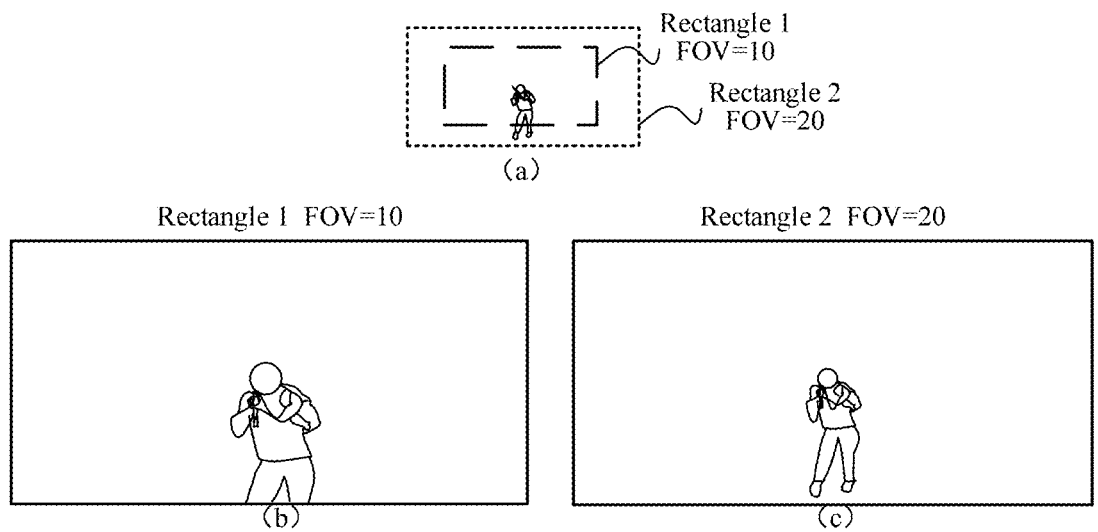
FIG. 10 is a schematic diagram of a scaling ratio of a virtual scene according to an embodiment of this application.

The foregoing step 205 and step 206 are a process of obtaining the scaling ratio of the virtual scene according to the target FOV, and the target FOV and the scaling ratio are in a negative correlation. The greater the target FOV is, the less the scaling ratio is. For example, as shown in FIG. 10, FIG. 10 (a) provides display regions of the virtual scene obtained when the target FOVs are respectively 10 and 20, and the display regions are respectively the region within the rectangle 1 and the region within the rectangle 2. As shown in FIG. 10 (b) and FIG. 10 (c), when the size of the terminal screen does not change, and the region within the rectangle 1 and the region within the rectangle 2 are pulled to be displayed in the terminal screen, a scaling ratio corresponding to a case that the target FOV is 10 is greater than a scaling ratio corresponding to a case that the target FOV is 20.

In a possible implementation, a correspondence between target FOVs and scaling ratios, that is, the transformation relationship between the target FOVs and the scaling ratios may be alternatively preset in the terminal. After obtaining the target FOV, the terminal may obtain a corresponding scaling ratio according to the correspondence or the transformation relationship, to scale the virtual scene in the display region according to the scaling ratio, and display the scaled virtual scene in the terminal screen. Certainly, the terminal may alternatively scale the virtual scene, and then obtain the display region of the virtual scene. This is not limited in the embodiments of this application.

Step 207. The terminal updates the virtual scene in the display region in the terminal screen according to the scaling ratio.

The terminal obtains the display region and the scaling ratio of the virtual scene, and may perform step 207, to display a virtual scene scaled according to the scaling ratio in the terminal screen, and content displayed in the terminal screen is the foregoing virtual scene in the display region. Step 207 is a process of displaying the virtual scene in the terminal screen according to the scaling ratio.

Figure 11:
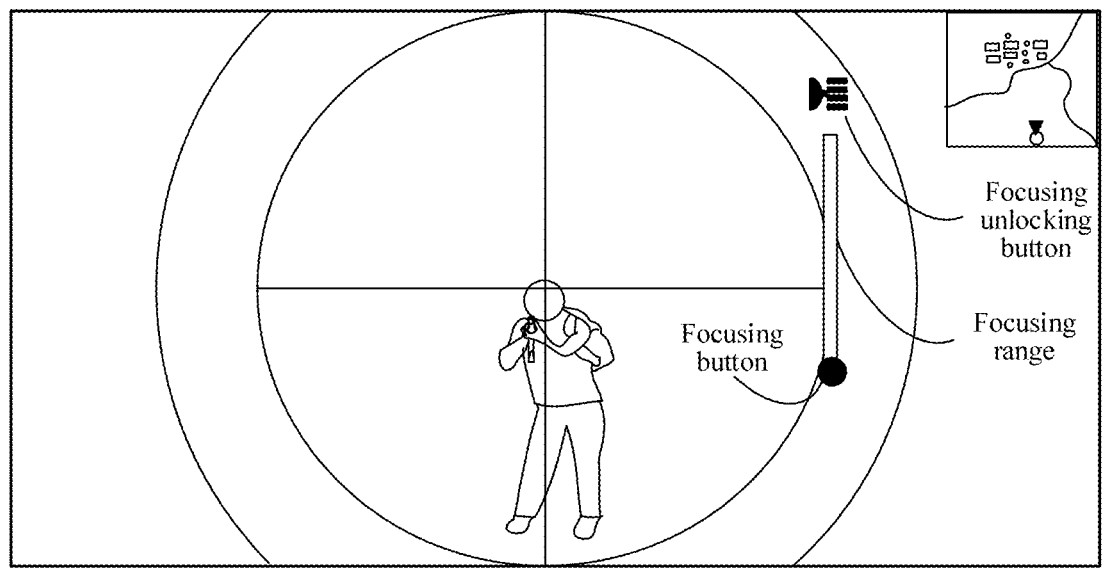
FIG. 11 is a schematic diagram of a terminal interface according to an embodiment of this application.
Figure 12:
FIG. 12 is a diagram of an actual interface of a terminal according to an embodiment of this application.

For example, as shown in FIG. 11, still using the example in which the scope is an 8×, and a focusing range of the 8× scope is a default scaling ratio corresponding to the 8× scope to a default scaling ratio corresponding to a 4× scope, the default FOV corresponding to the 8× scope is 10 degrees, and the default FOV corresponding to the 4× scope is 20 degrees. It is assumed that the user performs a touch operation on the focusing button, to drag the focusing button to the end point of the focusing range, the terminal may learn that the target FOV is 20 degrees according to the foregoing correspondence, so that when the target FOV that can be obtained by the terminal is 20 degrees, for the display region and the scaling ratio of the virtual scene, reference may be made to FIG. 9 and FIG. 10. The terminal scales the virtual scene in the display region according to the scaling ratio, and displays the scaled virtual scene in the terminal screen, and an actual interface of the terminal is shown in FIG. 12.

In a possible implementation, the terminal may alternatively obtain a display size of a scope frame of the scope, and display the scope frame of the scope in the terminal screen, so that a situation in which a virtual scene is observed by using a scope in a real environment can be really simulated.

In a real environment, when the scope is focused, a diameter of the bottom of the scope does not change, so that the size of the scope frame of the scope does not change either when the environment is observed based on the scope. When the terminal obtains the display size of the scope frame, a ratio of the display size of the scope frame of the scope to the size of the terminal screen is fixed, so that a display effect that can be reached by focusing a scope in a real environment can be really simulated. In a possible implementation, the terminal may adjust a distance between the lens of the camera and a bottom screen of the scope, to fix the ratio of the display size of the scope frame to the size of the terminal screen.

For example, the distance between the lens of the camera and the bottom screen of the scope may meet a formula as follows:

$$s = \frac{d}{\tan\frac{FOV}{2}}$$

where d is a width of the bottom screen of the scope, s is the distance between the lens and the bottom screen of the scope, FOV is an FOV corresponding to the scope, and the three parameters are all real numbers greater than 0.

Figure 13:
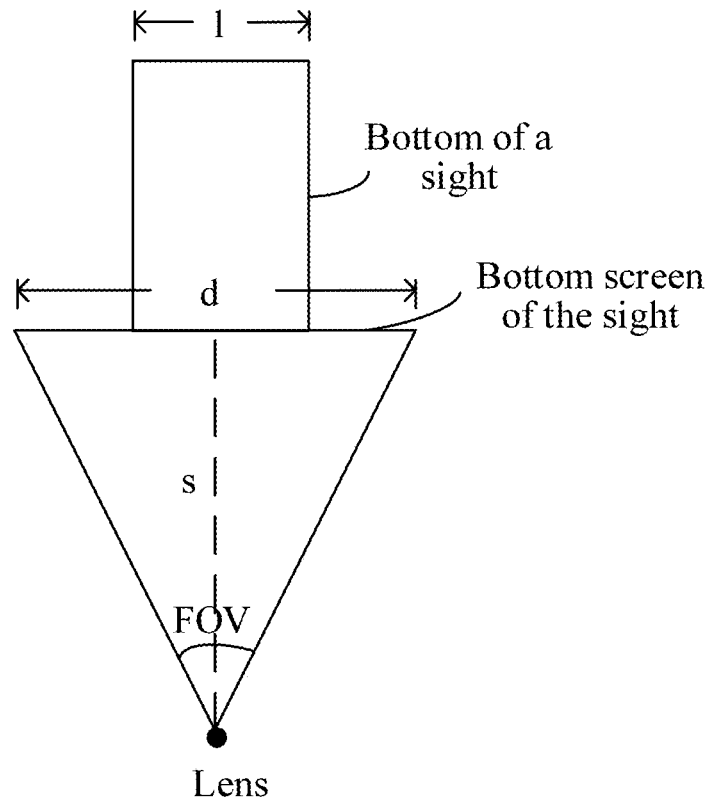
FIG. 13 is a schematic diagram of a location relationship between a lens and a scope according to an embodiment of this application.

As shown in FIG. 13, a diameter of the bottom of the scope is l, the width of the bottom screen of the scope is d, and the distance between the lens and the bottom screen of the scope is s, so that an angle between two edge lines of the lens and the bottom screen of the scope is the FOV. That is, l/d is the ratio of the display size of the scope frame of the scope to the size of the terminal screen when the virtual scene is displayed. To ensure that the display size of the scope frame of the scope does not change while displaying the virtual scene, because the size of the terminal screen does not change, and l/d does not change either, and because the diameter of the bottom of the scope in a real environment does not change, that is, l does not change, it is only ensured that d does not change either. Therefore, the distance s between the lens and the bottom screen of the scope can be adjusted according to the foregoing formula, to adjust the FOV.

In a possible implementation, in addition to the foregoing manner of adjusting the distance between the lens and the bottom screen of the scope, the terminal may further fix the ratio of the display size of the scope frame of the scope to the size of the terminal screen in another manner. For example, attributes of a model of the scope may be set in the terminal, so that the display size of the scope does not change as the FOV changes. For another example, while displaying the scope frame of the scope, the terminal may obtain a preset map, and display the map in the terminal screen, where the preset map is the scope frame of the scope. In this way, by obtaining a preset map as the scope frame of the to-be-displayed scope, the calculation process of the display size of the scope frame in the foregoing implementation may be reduced, and there is no need to obtain, render and display the model of the scope, thereby reducing the calculation amount and improving display efficiency.

Certainly, the display size of the scope frame of the scope and the scaling ratio of the virtual scene may alternatively be in a positive correlation. The greater the scaling ratio of the virtual scene is, the greater the display size of the scope frame is. In this way, the display size of the scope frame of the scope and the scaling ratio of the virtual scene change correspondingly, and the change of the display size of the scope frame of the scope may assist the user in perceiving a scaling situation of a current virtual scene, and an implementation that is specifically adopted is not specifically limited in the embodiments of this application.

To reduce the complexity of user operations, and improve the convenience of the user operations, the terminal may further save a current focusing result after the user stops focusing the scope, so that the current focusing result is directly used next time, to avoid repeated operations. Specifically, in a case of detecting that the display mode of the virtual scene switches from the scaling display mode based on a scope to a normal display mode, the terminal may store the target FOV corresponding to the scope, where the normal display mode refers to a display mode other than the scaling display mode based on a scope. The terminal may obtain the target FOV in a case of detecting that the virtual scene is in the scaling display mode based on the scope again. In this way, the terminal may perform the foregoing step 205 to step 207 based on the target FOV, and the user does not need to focus the scope again, thereby improving the convenience of user operations. In a possible implementation, in a case of detecting that the virtual scene is in the scaling display mode based on the scope again, as shown in FIG. 3, the terminal may display the focusing unlocking button in the terminal screen but does not display the focusing range or the focusing button. Certainly, the terminal may alternatively display the focusing range and the focusing button, and this is not limited in the embodiments of this application.

In a case of detecting that the display mode of the virtual scene switches from the scaling display mode based on a scope to a normal display mode, the terminal may cancel the display of the focusing button and the focusing range in the terminal screen, or cancel the display of the focusing unlocking button.

Figure 14:
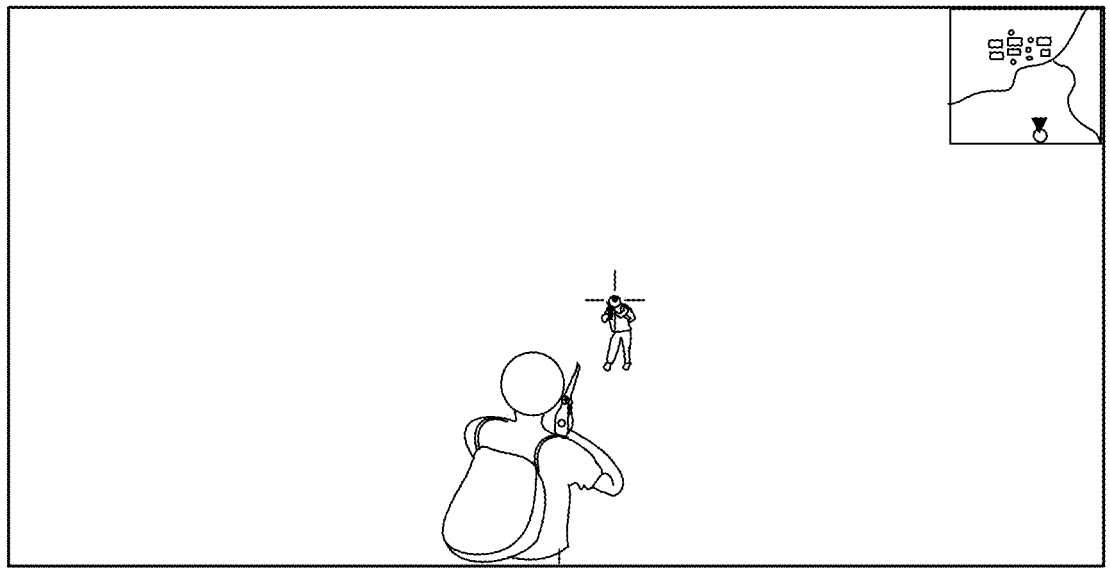
FIG. 14 is a schematic diagram of a terminal interface according to an embodiment of this application.
Figure 15:
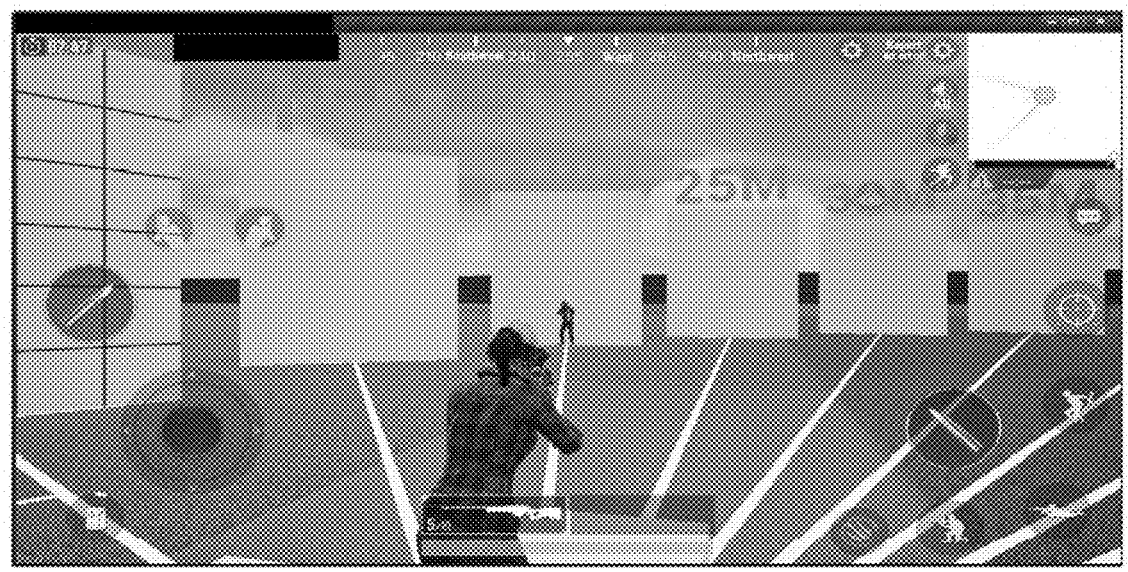
FIG. 15 is a diagram of an actual interface of a terminal according to an embodiment of this application.

For example, as shown in FIG. 14, the user may perform a touch operation on the aiming down scope button, or perform another touch operation of canceling the action of aiming down scope, and after detecting the touch operation, the terminal may obtain an initial FOV of the lens of the camera, to display the virtual scene. A scaling ratio of the virtual scene corresponding to the initial FOV of the lens may be 1. That is, when the display mode of the virtual scene is in a normal display mode, the virtual scene is a virtual scene that is not scaled, and an actual interface of the terminal is shown in FIG. 15.

In a possible implementation, when the virtual scene is in the scaling display mode based on a scope, the terminal may adopt a first-person viewing angle display manner, so that a virtual scene observed by the virtual object may be really simulated, and a case in which the virtual object controlled by the user of the terminal is displayed in the terminal screen to cause an unnecessary block to the virtual scene is avoided. In a case of detecting that the display mode of the virtual scene switches from the scaling display mode based on the scope to a normal display mode, the terminal may adopt a third-person viewing angle display manner. Certainly, the terminal may alternatively adopt the first-person viewing angle display manner, or switch between the two display manners according to an operation of the user. This is not limited in the embodiments of this application.

Figure 16:
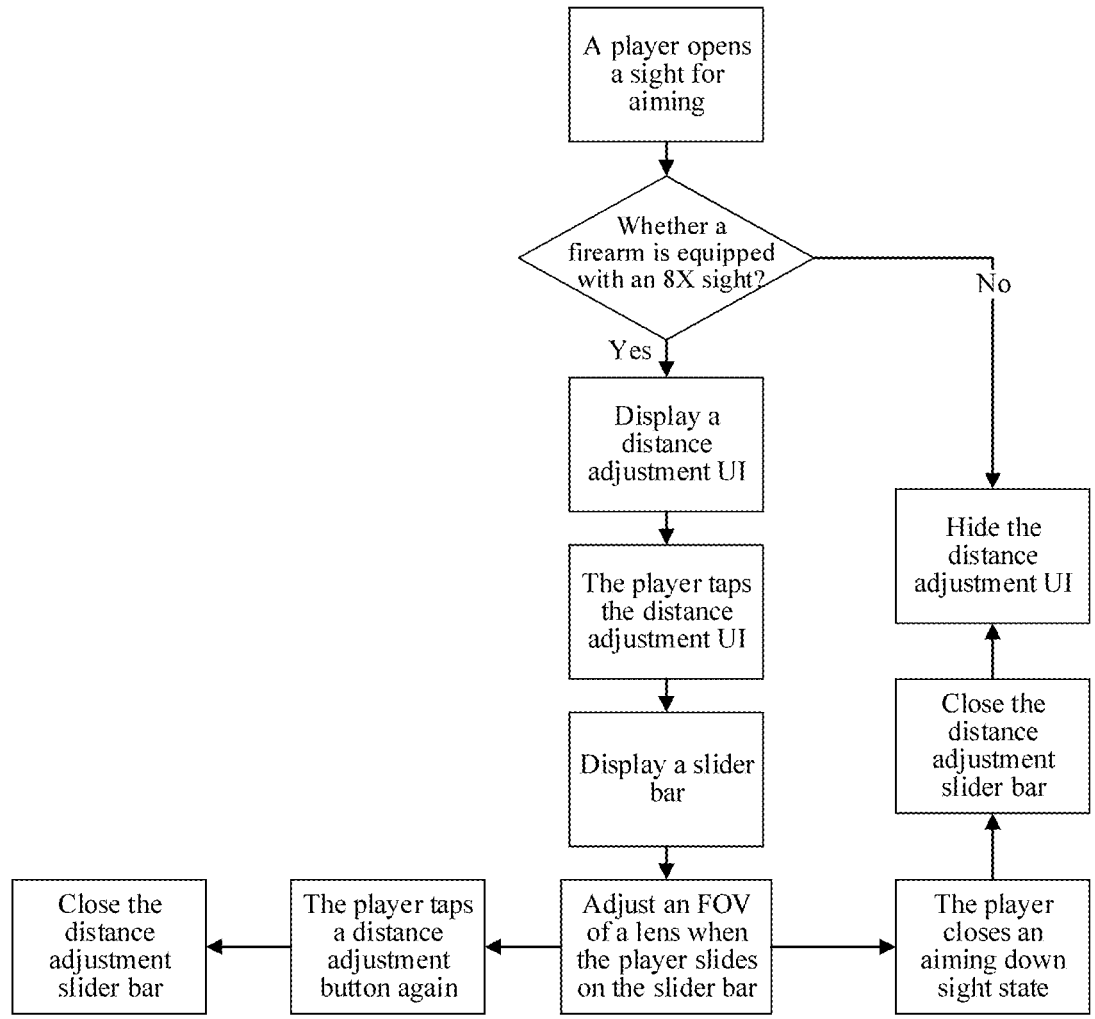
FIG. 16 is a flowchart of a virtual scene display method according to an embodiment of this application.

The terminal may adjust the scaling ratio of the virtual scene according to the touch operation of the user on the focusing button. A display situation of the operation performed by the user on the terminal in the foregoing process and a user interface (UI) of the terminal is described in detail below with reference to FIG. 16 by using a specific example. Description is made by using an example in which the terminal only provides a focusing function for an 8× scope, and the 8× scope is briefly referred to as an 8× scope below. As shown in FIG. 16, in a shooting game, a player opens a scope for aiming, that is, the player performs an aiming down scope operation, and the terminal may determine whether a firearm currently used by a virtual object controlled by the player is equipped with an 8× scope. If yes, the terminal displays a distance adjustment UI, and the distance adjustment UI is the focusing unlocking button and corresponds to step 201. If no, the terminal hides a focusing UI, and the focusing UI refers to the focusing unlocking button, the focusing range, and the focusing button. In a case that the terminal displays a distance adjustment zoom bar, the player may tap the distance adjustment UI, and the terminal may display a distance adjustment slider bar, where the distance adjustment slider bar is the focusing range and the focusing button, and this process corresponds to step 202. The player may slide on the distance adjustment slider bar to adjust the FOV of the lens, and this corresponds to step 203 and step 204. In this way, the terminal may further perform step 205 to step 207, to scale and display the virtual scene. If the player taps the distance adjustment button again, the distance adjustment slider bar may be closed. That is, in a case that a touch operation on the focusing unlocking button is detected again, the terminal may hide the focusing range and the focusing button. If the player closes the aiming down scope state, the distance adjustment slider bar is closed, and the distance adjustment UI is hidden. That is, in a case of detecting that the display mode of the virtual scene switches from a scaling display mode based on a scope to a normal display mode, the terminal may cancel the display of the focusing button and the focusing range in the terminal screen, or cancel the display of the focusing unlocking button.

Display forms or display styles of the focusing unlocking button, the focusing range, and the focusing button are concise and clear, and prompt information may be further provided in the display process, so that the user may quickly know functions of the buttons and how to operate the buttons, and display locations of the buttons may be the location of the scope frame of the scope, to ensure that the virtual scene is not blocked. Especially, in a video game scene, the buttons do not cause a block to a battle interface of the user, to ensure the concentration and immersion of the user in a battle process.

According to the embodiments of this application, a focusing button is provided in a scaling display mode based on a scope, an FOV corresponding to the scope may be adjusted according to a touch operation of a user on the focusing button, to obtain a target FOV, and a scaling ratio of the virtual scene is obtained according to the obtained target FOV, so that a virtual scene scaled according to the scaling ratio is displayed in a terminal screen. In this way, an operation of focusing the scope in the virtual scene is implemented, to really simulate a situation in which the scope is focused to observe a real scene in reality.

Further, in the embodiments of this application, the ratio of the display size of the scope frame of the scope to the size of the terminal screen is further fixed, so that a display effect that is reached by focusing a scope in a real environment can be really simulated.

Further, in the embodiments of this application, the terminal may further save a current focusing result after the user stops focusing the scope, so that the current focusing result is directly used next time, to avoid repeated operations, thereby reducing the complexity of user operations, and improving the convenience of the user operations.

All the foregoing optional technical solutions may be arbitrarily combined to form an optional embodiment of this application, and details are not described herein again.

Figure 17:
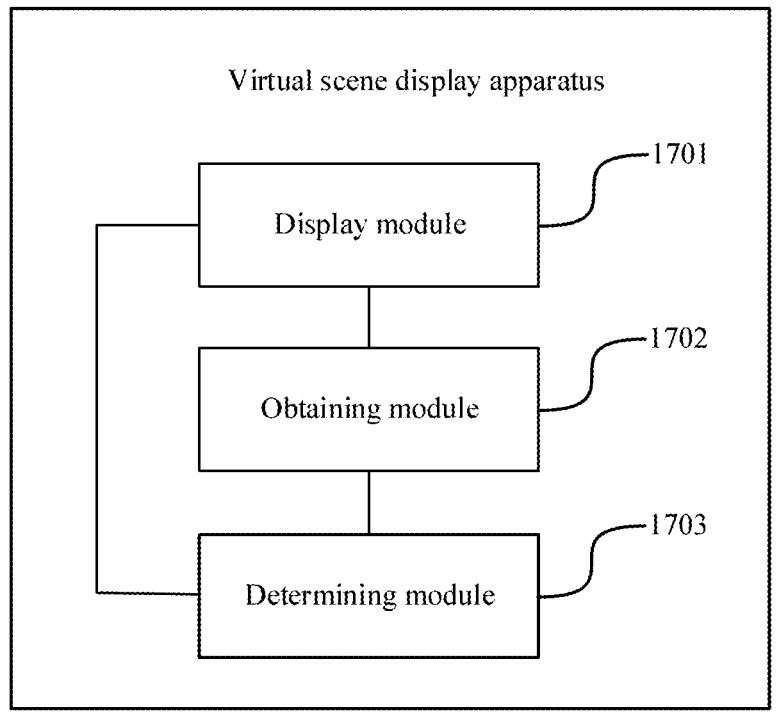
FIG. 17 is a schematic structural diagram of a virtual scene display apparatus according to an embodiment of this application.

FIG. 17 is a schematic structural diagram of a virtual scene display apparatus according to an embodiment of this application. Referring to FIG. 17, the apparatus includes:

a display module 1701, configured to display a focusing button in a terminal screen in a case that a virtual scene is in a scaling display mode based on a scope, the focusing button being configured to adjust a scaling ratio of the virtual scene;

an obtaining module 1702, configured to obtain an adjusted target FOV corresponding to the scope according to a touch operation on the focusing button; and a determining module 1703, configured to obtain the scaling ratio of the virtual scene according to the target FOV, the target FOV and the scaling ratio being in a negative correlation; and the display module 1701 being further configured to display the virtual scene in the terminal screen according to the scaling ratio.

In a possible implementation, the display module 1701 is configured to:

display a focusing unlocking button in the terminal screen; and display, in a case that a touch operation on the focusing unlocking button is detected, a focusing range in a surrounding region of the focusing unlocking button, and display the focusing button at a starting point of the focusing range.

In a possible implementation, the obtaining module 1702 is configured to:

obtain a location of the focusing button in the focusing range according to the touch operation on the focusing button; and obtain a target FOV corresponding to the location according to a correspondence between locations and FOVs.

In a possible implementation, the display module 1701 is further configured to hide the focusing button and the focusing range in a case that a touch operation on the focusing unlocking button is detected again.

In a possible implementation, the determining module 1703 is configured to:

obtain a display region of the virtual scene according to the target FOV, a size of the display region and the target FOV being in a positive correlation; and obtain the scaling ratio of the virtual scene according to the size of the display region and a size of the terminal screen, the scaling ratio of the virtual scene being used for scaling the virtual scene in the display region to the size of the terminal screen.

In a possible implementation, the display module 1701 is further configured to:

obtain a display size of a scope frame of the scope; and
display the scope frame of the scope in the terminal screen.

In a possible implementation, a ratio of the display size of the scope frame of the scope to the size of the terminal screen is fixed; or the display size of the scope frame of the scope and the scaling ratio of the virtual scene are in a positive correlation.

In a possible implementation, the apparatus further includes:

a storage module, configured to store the target FOV corresponding to the scope in a case of detecting that a display mode of the virtual scene switches from the scaling display mode based on the scope to a normal display mode; and the obtaining module 1702 being further configured to obtain the target FOV in a case of detecting that the virtual scene is in the scaling display mode based on the scope again.

According to the apparatus provided in the embodiments of this application, a focusing button is provided in a scaling display mode based on a scope, an FOV corresponding to the scope may be adjusted according to a touch operation of a user on the focusing button, to obtain a target FOV, and a scaling ratio of the virtual scene is obtained according to the obtained target FOV, so that a virtual scene scaled according to the scaling ratio is displayed in a terminal screen. In this way, an operation of focusing the scope in the virtual scene is implemented, to really simulate a situation in which the scope is focused to observe a real scene in reality.

The division of the above functional modules is only described for exemplary purposes when the virtual scene display apparatus provided in the foregoing embodiment displays a virtual scene. In actual application, the functions may be allocated to different functional modules according to specific needs, which means that the internal structure of the apparatus is divided into different functional modules to complete all or some of the above described functions. In addition, the virtual scene display apparatus provided in the foregoing embodiment belongs to a same concept as the virtual scene display method embodiment. For a specific implementation process of the apparatus, refer to the method embodiment. Details are not described herein again.

Figure 18:
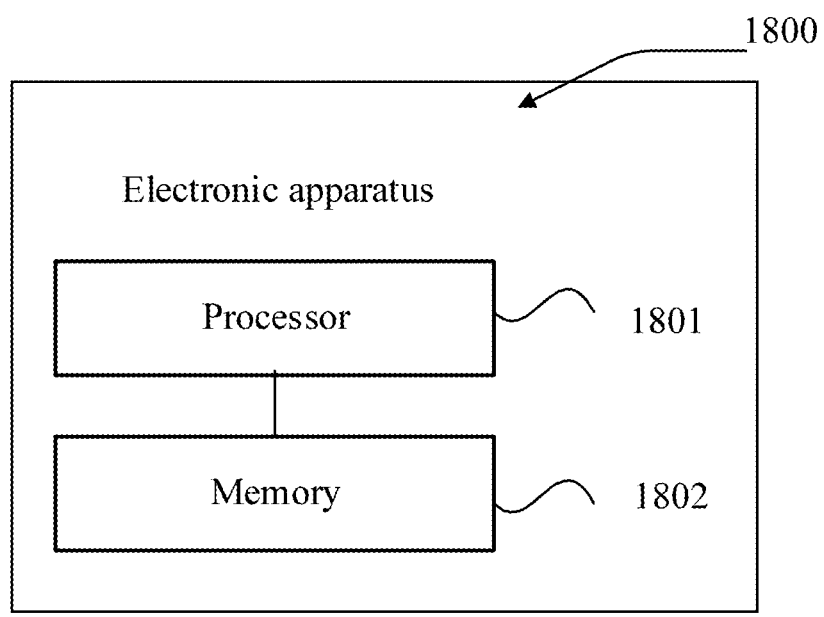
FIG. 18 is a schematic structural diagram of an electronic apparatus 1800 according to an embodiment of this application.

FIG. 18 is a schematic structural diagram of an electronic apparatus 1800 according to an embodiment of this application, and the electronic apparatus may be provided as the foregoing terminal. The electronic apparatus 1800 may vary greatly due to different configurations or performance, and may include one or more central processing units (CPU) 1801 and one or more memories 1802. The memory 1802 stores at least one instruction, and the at least one instruction is loaded and executed by the processor 1801 to implement operations of a virtual scene display method as follows:

displaying a focusing button in a terminal screen in a case that a virtual scene is in a scaling display mode based on a scope, the focusing button being configured to adjust a scaling ratio of the virtual scene;

obtaining an adjusted target FOV corresponding to the scope according to a touch operation on the focusing button;

obtaining the scaling ratio of the virtual scene according to the target FOV, the target FOV and the scaling ratio being in a negative correlation; and displaying the virtual scene in the terminal screen according to the scaling ratio.

In a possible implementation, the processor 1801 is further configured to:

display a focusing unlocking button in the terminal screen; and display, in a case that a touch operation on the focusing unlocking button is detected, a focusing range in a surrounding region of the focusing unlocking button, and display the focusing button at a starting point of the focusing range.

In a possible implementation, the processor 1801 is configured to:

obtain a location of the focusing button in the focusing range according to the touch operation on the focusing button; and obtain a target FOV corresponding to the location according to a correspondence between locations and FOVs.

In a possible implementation, the processor 1801 is further configured to:

hide the focusing button and the focusing range in a case that a touch operation on the focusing unlocking button is detected again.

In a possible implementation, the processor 1801 is configured to:

obtain a display region of the virtual scene according to the target FOV, a size of the display region and the target FOV being in a positive correlation; and obtain the scaling ratio of the virtual scene according to the size of the display region and a size of the terminal screen, the scaling ratio of the virtual scene being used for scaling the virtual scene in the display region to the size of the terminal screen.

In a possible implementation, the processor 1801 is configured to:

obtain a display size of a scope frame of the scope; and
display the scope frame of the scope in the terminal screen.

In a possible implementation, a ratio of the display size of the scope frame of the scope to the size of the terminal screen is fixed; or the display size of the scope frame of the scope and the scaling ratio of the virtual scene are in a positive correlation.

In a possible implementation, the processor 1801 is configured to:

store the target FOV corresponding to the scope in a case of detecting that a display mode of the virtual scene switches from the scaling display mode based on the scope to a normal display mode; and obtain the target FOV in a case of detecting that the virtual scene is in the scaling display mode based on the scope again.

Certainly, the electronic apparatus may further include components such as a wired or wireless network interface, a keyboard, and an input/output (I/O) interface, to facilitate I/O. The electronic apparatus may further include another component configured to implement functions of a device, and details are not described herein again.

In an exemplary embodiment, a computer-readable storage medium is further provided, for example, a memory including an instruction, where the instruction may be executed by a processor to complete the method operations of a virtual scene display method as follows:

displaying a focusing button in a terminal screen in a case that a virtual scene is in a scaling display mode based on a scope, the focusing button being configured to adjust a scaling ratio of the virtual scene;

obtaining an adjusted target FOV corresponding to the scope according to a touch operation on the focusing button;

obtaining the scaling ratio of the virtual scene according to the target FOV, the target FOV and the scaling ratio being in a negative correlation; and displaying the virtual scene in the terminal screen according to the scaling ratio.

In a possible implementation, the instruction is loaded and executed by the processor to implement the following method operations:

displaying a focusing unlocking button in the terminal screen; and displaying, in a case that a touch operation on the focusing unlocking button is detected, a focusing range in a surrounding region of the focusing unlocking button, and displaying the focusing button at a starting point of the focusing range.

In a possible implementation, the instruction is loaded and executed by the processor to implement the following method operations:

obtaining a location of the focusing button in the focusing range according to the touch operation on the focusing button; and obtaining a target FOV corresponding to the location according to a correspondence between locations and FOVs.

In a possible implementation, the instruction is loaded and executed by the processor to implement the following method operations:

hiding the focusing button and the focusing range in a case that a touch operation on the focusing unlocking button is detected again.

In a possible implementation, the instruction is loaded and executed by the processor to implement the following method operations:

obtaining a display region of the virtual scene according to the target FOV, a size of the display region and the target FOV being in a positive correlation; and obtaining the scaling ratio of the virtual scene according to the size of the display region and a size of the terminal screen, the scaling ratio of the virtual scene being used for scaling the virtual scene in the display region to the size of the terminal screen.

In a possible implementation, the instruction is loaded and executed by the processor to implement the following method operations:

obtaining a display size of a scope frame of the scope; and displaying the scope frame of the scope in the terminal screen.

In a possible implementation, a ratio of the display size of the scope frame of the scope to the size of the terminal screen is fixed; or the display size of the scope frame of the scope and the scaling ratio of the virtual scene are in a positive correlation.

In a possible implementation, the instruction is loaded and executed by the processor to implement the following method operations:

storing the target FOV corresponding to the scope in a case of detecting that a display mode of the virtual scene switches from the scaling display mode based on the scope to a normal display mode; and obtaining the target FOV in a case of detecting that the virtual scene is in the scaling display mode based on the scope again.

For example, the computer readable storage medium may be a ROM, a random access memory (RAM), a CD-ROM, a magnetic tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A virtual scene display method, applied to an electronic apparatus having a processor and memory storing a plurality of programs to be executed by the processor, and the method comprising:

displaying a focusing button in a terminal screen in a case that a virtual scene is in a scaling display mode based on a scope, the focusing button being configured to adjust a scaling ratio of the virtual scene;

obtaining an adjusted target field of view (FOV) corresponding to the scope according to a touch operation on the focusing button;

determining an adjusted display region of the virtual scene corresponding to the adjusted target FOV, the target FOV and the adjusted display region of the virtual scene being in a positive correlation;

determining the scaling ratio of the virtual scene according to the adjusted display region of the virtual scene corresponding to the target FOV and a size of the terminal screen, the scaling ratio being a ratio of the size of the terminal screen and the adjusted display region of the virtual scene; and updating the virtual scene in the terminal screen according to the scaling ratio.

2. The method according to claim 1, wherein the displaying a focusing button in a terminal screen comprises:

displaying a focusing unlocking button in the terminal screen; and displaying, in a case that a touch operation on the focusing unlocking button is detected, a focusing range in a surrounding region of the focusing unlocking button, and displaying the focusing button at a starting point of the focusing range.

3. The method according to claim 2, wherein the obtaining an adjusted target field of view (FOV) corresponding to the scope according to a touch operation on the focusing button comprises:
 obtaining a location of the focusing button in the focusing range according to the touch operation on the focusing button; and
 obtaining a target FOV corresponding to the location according to a correspondence between locations and FOVs.

4. The method according to claim 2, the method further comprising:
 hiding the focusing button and the focusing range in a case that a touch operation on the focusing unlocking button is detected again.

5. The method according to claim 1, wherein the obtaining the scaling ratio of the virtual scene according to the target FOV comprises:
 obtaining a display region of the virtual scene according to the target FOV, a size of the display region and the target FOV being in a positive correlation; and
 obtaining the scaling ratio of the virtual scene according to the size of the display region and a size of the terminal screen, the scaling ratio of the virtual scene being used for scaling the virtual scene in the display region to the size of the terminal screen.

6. The method according to claim 1, wherein the displaying the virtual scene in the terminal screen according to the scaling ratio further comprises:
 obtaining a display size of a scope frame of the scope; and
 displaying the scope frame of the scope in the terminal screen.

7. The method according to claim 6, wherein a ratio of the display size of the scope frame of the scope to the size of the terminal screen is fixed; or the display size of the scope frame of the scope and the scaling ratio of the virtual scene are in a positive correlation.

8. The method according to claim 1, the method further comprising:
 storing the target FOV corresponding to the scope in a case of detecting that a display mode of the virtual scene switches from the scaling display mode based on the scope to a normal display mode; and
 obtaining the target FOV in a case of detecting that the virtual scene is in the scaling display mode based on the scope again.

9. An electronic apparatus, comprising a processor and memory, the memory storing a plurality of programs, and the plurality of programs being loaded and executed by the processor to implement a plurality of operations including:
 displaying a focusing button in a terminal screen in a case that a virtual scene is in a scaling display mode based on a scope, the focusing button being configured to adjust a scaling ratio of the virtual scene;
 obtaining an adjusted target field of view (FOV) corresponding to the scope according to a touch operation on the focusing button;
 determining an adjusted display region of the virtual scene corresponding to the adjusted target FOV, the target FOV and the adjusted display region of the virtual scene being in a positive correlation;
 determining the scaling ratio of the virtual scene according to the adjusted display region of the virtual scene corresponding to the target FOV and a size of the terminal screen, the scaling ratio being a ratio of the size of the terminal screen and the adjusted display region of the virtual scene; and
 updating the virtual scene in the terminal screen according to the scaling ratio.

10. The electronic apparatus according to claim 9, wherein the displaying a focusing button in a terminal screen comprises:
 displaying a focusing unlocking button in the terminal screen; and
 displaying, in a case that a touch operation on the focusing unlocking button is detected, a focusing range in a surrounding region of the focusing unlocking button, and displaying the focusing button at a starting point of the focusing range.

11. The electronic apparatus according to claim 10, wherein the obtaining an adjusted target field of view (FOV) corresponding to the scope according to a touch operation on the focusing button comprises:
 obtaining a location of the focusing button in the focusing range according to the touch operation on the focusing button; and
 obtaining a target FOV corresponding to the location according to a correspondence between locations and FOVs.

12. The electronic apparatus according to claim 10, wherein the plurality of operations further comprise:
 hiding the focusing button and the focusing range in a case that a touch operation on the focusing unlocking button is detected again.

13. The electronic apparatus according to claim 9, wherein the obtaining the scaling ratio of the virtual scene according to the target FOV comprises:
 obtaining a display region of the virtual scene according to the target FOV, a size of the display region and the target FOV being in a positive correlation; and
 obtaining the scaling ratio of the virtual scene according to the size of the display region and a size of the terminal screen, the scaling ratio of the virtual scene being used for scaling the virtual scene in the display region to the size of the terminal screen.

14. The electronic apparatus according to claim 9, wherein the displaying the virtual scene in the terminal screen according to the scaling ratio further comprises:
 obtaining a display size of a scope frame of the scope; and
 displaying the scope frame of the scope in the terminal screen.

15. The electronic apparatus according to claim 14, wherein a ratio of the display size of the scope frame of the scope to the size of the terminal screen is fixed; or the display size of the scope frame of the scope and the scaling ratio of the virtual scene are in a positive correlation.

16. The electronic apparatus according to claim 9, wherein the plurality of operations further comprise:
 storing the target FOV corresponding to the scope in a case of detecting that a display mode of the virtual scene switches from the scaling display mode based on the scope to a normal display mode; and
 obtaining the target FOV in a case of detecting that the virtual scene is in the scaling display mode based on the scope again.

17. A non-transitory computer-readable storage medium storing a plurality of programs that, when executed by a processor of an electronic device, cause the electronic device to perform a plurality of operations including:
 displaying a focusing button in a terminal screen in a case that a virtual scene is in a scaling display mode based on a scope, the focusing button being configured to adjust a scaling ratio of the virtual scene;

obtaining an adjusted target field of view (FOV) corresponding to the scope according to a touch operation on the focusing button;

determining an adjusted display region of the virtual scene corresponding to the adjusted target FOV, the target FOV and the adjusted display region of the virtual scene being in a positive correlation;

determining the scaling ratio of the virtual scene according to the adjusted display region of the virtual scene corresponding to the target FOV and a size of the terminal screen, the scaling ratio being a ratio of the size of the terminal screen and the adjusted display region of the virtual scene; and updating the virtual scene in the terminal screen according to the scaling ratio.

18. The non-transitory computer-readable storage medium according to claim 17, wherein the displaying a focusing button in a terminal screen comprises:

displaying a focusing unlocking button in the terminal screen; and displaying, in a case that a touch operation on the focusing unlocking button is detected, a focusing range in a surrounding region of the focusing unlocking button, and displaying the focusing button at a starting point of the focusing range.

19. The non-transitory computer-readable storage medium according to claim 17, wherein the obtaining an adjusted target field of view (FOV) corresponding to the scope according to a touch operation on the focusing button comprises:

obtaining a location of the focusing button in the focusing range according to the touch operation on the focusing button; and obtaining a target FOV corresponding to the location according to a correspondence between locations and FOVs.

20. The non-transitory computer-readable storage medium according to claim 17, wherein the plurality of operations further comprise:

hiding the focusing button and the focusing range in a case that a touch operation on the focusing unlocking button is detected again.

* * * * *